United States Patent [19]
Waycuilis

[11] Patent Number: 6,017,501
[45] Date of Patent: Jan. 25, 2000

[54] DISPOSAL OF HYDROGEN SULFIDE GAS BY CONVERSION TO SULFATE IONS IN AN AQUEOUS SOLUTION

[75] Inventor: John J. Waycuilis, Cypress, Tex.

[73] Assignee: Marathon Oil Company, Findlay, Ohio

[21] Appl. No.: 08/998,436

[22] Filed: Dec. 26, 1997

[51] Int. Cl.$^7$ .................................................. B01D 53/52
[52] U.S. Cl. .................... 423/220; 423/224; 423/243.03; 423/544
[58] Field of Search .................................. 423/220, 224, 423/243.03, 544

[56] References Cited

U.S. PATENT DOCUMENTS

| | | | |
|---|---|---|---|
| 3,701,824 | 10/1972 | Prahacs et al. | 423/225 |
| 3,932,584 | 1/1976 | Asakusa et al. | 423/234 |
| 4,212,852 | 7/1980 | Aibe et al. | 423/230 |
| 4,358,427 | 11/1982 | Urban | 423/230 |
| 4,579,727 | 4/1986 | Cronkright et al. | 423/573 R |
| 4,723,603 | 2/1988 | Plummer | 166/275 |
| 4,781,910 | 11/1988 | Van Dijk | 423/573 R |
| 4,839,154 | 6/1989 | Allison et al. | 423/544 |
| 5,028,340 | 7/1991 | Gallup | 210/753 |
| 5,207,927 | 5/1993 | Marinangeli et al. | 210/763 |
| 5,256,384 | 10/1993 | Rolke et al. | 423/220 |
| 5,352,370 | 10/1994 | Hayden | 210/763 |

FOREIGN PATENT DOCUMENTS

| | | |
|---|---|---|
| 2078966 A1 | 3/1994 | Canada . |
| 2 202 840 | 10/1988 | United Kingdom . |

Primary Examiner—Gary P. Straub
Assistant Examiner—Timothy C Vanoy
Attorney, Agent, or Firm—Jack E. Ebel

[57] ABSTRACT

A process is provided for disposing of hydrogen sulfide contained in a gas stream, wherein a first gas feed stream having a hydrogen sulfide gas component, a second gas feed stream having an oxygen gas component, and an aqueous liquid feed stream are combined to form a reaction mixture. The aqueous liquid feed stream may be water available in remote oilfield locales, such as produced water, or sea water. The aqueous liquid feed stream may include a significant concentration of preexisting sulfate ions, in which case it is generally desirable to remove the preexisting sulfate ions using membrane separation before mixing the aqueous liquid feed stream with the first and second gas feed streams. The resultant low sulfate liquid may further comprise one or more of the following dissolved ions: $Na^+$, $K^+$, $Mg^{2+}$, $Cl^-$, $Br^-$, $HCO_3^-$. The reaction mixture is contacted with a catalyst, which is preferably an activated carbon, capable of inducing catalytic oxidation of the hydrogen sulfide gas component to produce sulfate ions. Oxidation of the reaction mixture results in a product mixture substantially free of elemental sulfur and having an aqueous liquid product stream which retains the produced sulfate ions in solution and a gas product stream which is substantially free of hydrogen sulfide. The gas product stream is separated from the aqueous liquid product stream and the two streams are separately disposed. The gas product stream is conventionally disposed by discharge into the atmosphere. The aqueous liquid product stream is conventionally disposed by discharge to the environment.

22 Claims, 1 Drawing Sheet

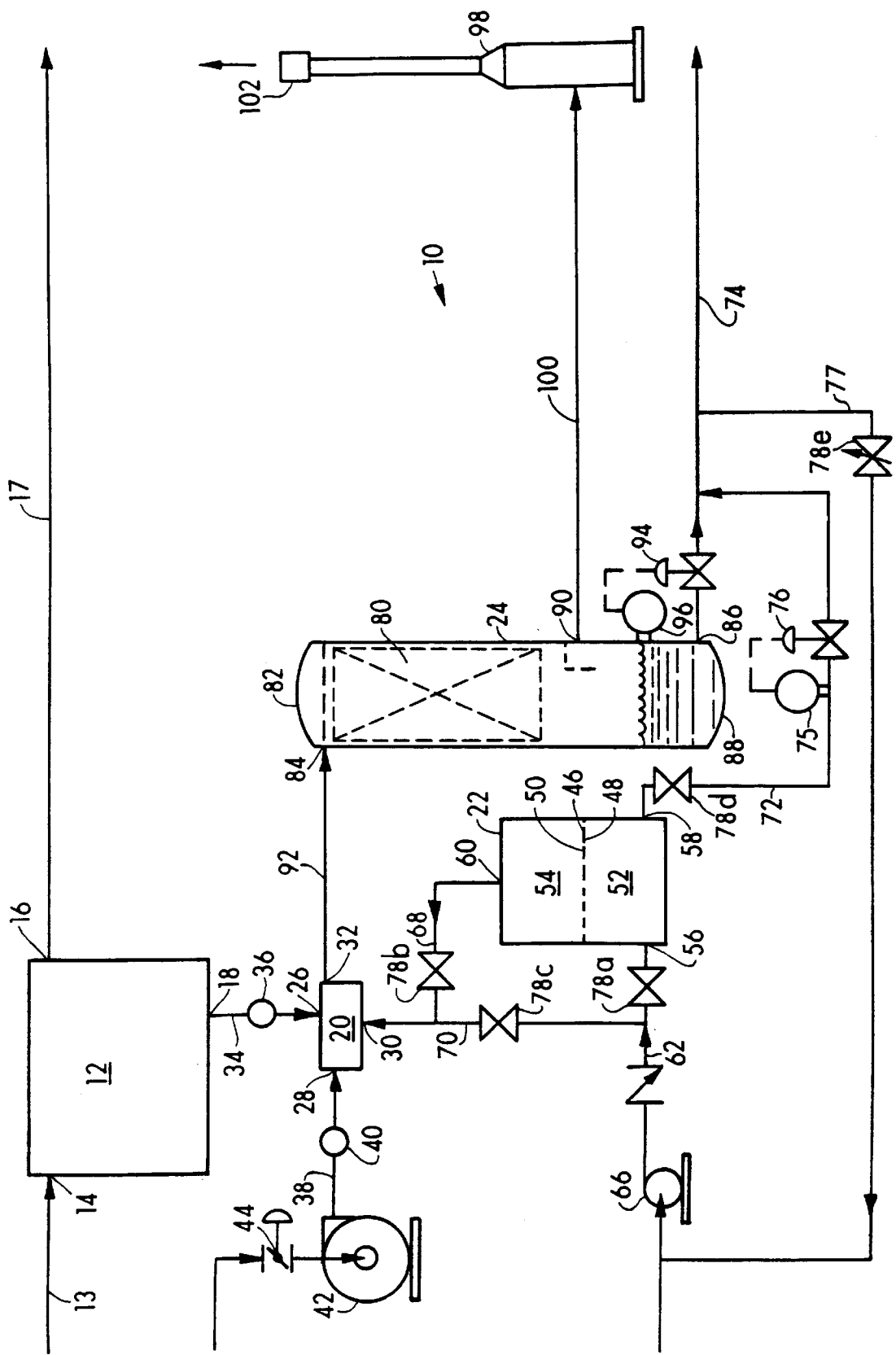

DISPOSAL OF HYDROGEN SULFIDE GAS BY CONVERSION TO SULFATE IONS IN AN AQUEOUS SOLUTION

BACKGROUND OF THE INVENTION

TECHNICAL FIELD

The present invention relates generally to a process for disposing of hydrogen sulfide contained in a gas stream and, more particularly, to a hydrogen sulfide disposal process, wherein the hydrogen sulfide-containing gas stream is mixed with an aerated aqueous liquid and the hydrogen sulfide is catalytically oxidized to sulfate ions, which remain dissolved in the aqueous liquid.

BACKGROUND INFORMATION

Hydrogen sulfide is an unwanted component of many industrial gas streams. It is advantageous to remove the hydrogen sulfide from the gas stream and recover or dispose the hydrogen sulfide before the gas stream is utilized for its intended purpose. For example, hydrogen sulfide is frequently present in raw natural gas produced from subterranean formations. If the raw natural gas is combusted without removal of the hydrogen sulfide, unacceptable levels of environmentally objectionable sulfurous pollutants, such as sulfur dioxide, are released to the atmosphere. Furthermore, the highly corrosive nature of hydrogen sulfide with respect to natural gas transportation and handling equipment as well as industrial process equipment coming into contact with the natural gas places a priority on removal of hydrogen sulfide from raw natural gas to avoid unduly damaging such equipment.

The amine process is a conventional process for removing hydrogen sulfide from raw natural gas. In accordance with the amine process, a raw natural gas containing hydrogen sulfide, termed sour natural gas, is fed to the process inlet and two separate streams are delivered to the process outlet: 1) a sweet natural gas product substantially free of hydrogen sulfide; and 2) a concentrated hydrogen sulfide off-gas. The hydrogen sulfide in the off-gas stream is then subjected to recovery or disposal. Conventional hydrogen sulfide recovery processes include direct recovery of the hydrogen sulfide from the off-gas stream or conversion of the hydrogen sulfide to elemental sulfur and indirect recovery of the hydrogen sulfide from the off-gas stream as elemental sulfur. In many cases, however, neither type of recovery process is economical or practical, particularly for offshore or small-scale applications.

The alternative to recovery is disposal of the hydrogen sulfide. One conventional disposal means is a chemical scavenging process, wherein the off-gas stream is contacted with a solid scavenger, which converts and binds the hydrogen sulfide present in the off-gas stream. The spent scavenger having the converted hydrogen sulfide bound thereto is typically disposed in a landfill. This disposal means, however, may likewise be uneconomical due to relatively high material, labor and landfill costs. Alternate more economical disposal means, such as venting the hydrogen sulfide-containing off-gas to the atmosphere or incinerating the hydrogen sulfide-containing off-gas to produce sulfur dioxide, are impermissible from an environmental regulatory standpoint. Thus, it is apparent that a need exists for a practical, economical and environmentally compatible means for disposing hydrogen sulfide contained in a gas stream. Accordingly, it is an object of the present invention to provide an effective process for disposing hydrogen sulfide present in a gas stream. This object and others are achieved in accordance with the invention described hereafter.

SUMMARY OF THE INVENTION

The present invention is a process for disposing of hydrogen sulfide contained in a gas stream. The process comprises mixing a first gas feed stream having a hydrogen sulfide gas component, a second gas feed stream having an oxygen gas component, and an aqueous liquid feed stream to form a reaction mixture. In a preferred embodiment, the first gas feed stream is an off-gas from a hydrogen sulfide removal unit, such as an amine unit, employed to remove hydrogen sulfide from a natural gas. As such, the off-gas has a relatively high hydrogen sulfide concentration. The second gas feed stream is preferably air, which aerates the aqueous liquid feed stream. The aqueous liquid feed stream is typically a water available in remote oilfield locales, such as a produced water or sea water, either of which is likely to include preexisting sulfate ions. If a significant concentration of preexisting sulfate ions are present in the aqueous feed liquid stream, it is generally desirable to remove the preexisting sulfate ions from the aqueous liquid feed stream, preferably before mixing the aqueous liquid feed stream with the first and second gas feed streams. Removal of the preexisting sulfate ions may be effected in a sulfate removal unit by means of membrane separation utilizing a selective membrane, such as a polyamide or polyimide membrane.

The process of the present invention further comprises contacting the reaction mixture with a catalyst, which is preferably an activated carbon capable of inducing catalytic oxidation of the hydrogen sulfide gas component. The hydrogen sulfide gas component catalytically reacts with the oxygen gas component in the presence of the catalyst to produce sulfate ions as the oxidation product. The resulting produced sulfate ions are contained within a product mixture having two streams, an aqueous liquid product stream which retains the produced sulfate ions in solution and a gas product stream which is substantially free of hydrogen sulfide. The product mixture is characterized as being substantially free of elemental sulfur, mercaptans and polysulfides. The gas product stream is separated from the aqueous liquid product stream of the product mixture and the two streams are separately disposed. The gas product stream is conventionally disposed by discharge to the environment, preferably by discharge into the atmosphere using venting or flaring means. The aqueous liquid product stream is conventionally disposed by discharge to the environment, preferably by returning the aqueous liquid product stream to the sea or reinjecting the aqueous liquid product stream into a subterranean formation. The invention will be further understood from the accompanying drawings and description.

BRIEF DESCRIPTION OF THE DRAWING

The FIGURE is a schematic of a system utilized to practice the process of the present invention.

DESCRIPTION OF PREFERRED EMBODIMENT

The present invention relates to a hydrogen sulfide disposal process. The process is described with reference to the FIGURE, wherein a system having utility in the practice of the process is generally designated 10. The system 10 demonstrates a preferred embodiment of the process, wherein the hydrogen sulfide being disposed is a gaseous component of an off-gas from a hydrogen sulfide removal unit 12. In particular, the hydrogen sulfide removal unit 12 is an amine unit for removing hydrogen sulfide from a sour natural gas feed which is fed to the unit 12 from a sour natural gas source (not shown), such as a subterranean natural gas-bearing formation, via a sour gas line 13 and sour gas inlet 14. The unit 12 produces a sweet natural gas product which is discharged from the unit 12 via a sweet gas outlet 16 and sweet gas line 17 for conventional downstream applications (not shown). The unit 12 further produces a hydrogen sulfide-rich sour off-gas which is discharged from the unit 12 via a sour gas outlet 18.

The system 10 comprises a mixer 20, a sulfate removal unit 22, and a reaction vessel 24. The mixer 20 is a conventional fluid mixer capable of mixing one or more gas phase streams with one or more liquid phase streams. The mixer 20 has a first gas inlet 26, a second gas inlet 28, a liquid inlet 30, and a reaction mixture outlet 32. The first gas inlet 26 is connected to the sour gas outlet 18 by means of a first gas line 34 providing fluid communication between the hydrogen sulfide removal unit 12 and the mixer 20. The first gas line 34 is fitted with a meter 36, enabling the practitioner to measure the flow of a first gas feed stream through the first gas line 34, which is the hydrogen sulfide-rich sour off-gas discharged from the hydrogen sulfide removal unit 12. The second gas inlet 28 is connected to a source (not shown) of a second gas feed stream by means of a second gas line 38 providing fluid communication between the source of the second feed gas stream and the mixer 20. The second gas feed stream is an oxygen-rich gas, preferably air with the ambient atmosphere being the source of the air. The second gas line 38 is fitted with a meter 40, enabling the practitioner to regulate the flow of the second gas feed stream through the second gas line 38. A blower 42 and associated damper 44 are also provided in the second gas line 38 to draw the second gas feed stream from the source and drive the second gas feed stream through the second gas line 38 and second gas inlet 28 into the mixer 20.

The sulfate removal unit 22 is preferably a conventional membrane unit, such as disclosed in U.S. Pat. No. 4,723,603 (MOC membrane patent), incorporated herein by reference. The membrane unit 22 encases a selective membrane 46 having a first side 48 and a second side 50. The selective membrane 46 divides the unit 22 into a high sulfate chamber 52 and a low sulfate chamber 54. The selective membrane 46 is preferably a polyamide or polyimide membrane capable of removing sulfate ions from an aqueous liquid. A high sulfate liquid inlet 56 and high sulfate liquid outlet 58 are provided in the high sulfate chamber 52 and a low sulfate liquid outlet 60 is provided in the low sulfate chamber 54. The high sulfate liquid inlet 56 is connected to an aqueous liquid line 62, which extends to a source (not shown) of an aqueous liquid feed stream. A pump 66 is provided in the aqueous liquid line 62 to draw the aqueous liquid feed stream from the source and drive the aqueous liquid feed stream through the aqueous liquid line 62 and aqueous liquid inlet 56 into the membrane unit 22 with sufficient pressure to enable effective operation of the membrane unit 22. The aqueous liquid feed stream is preferably a water of the type available in remote oil field locales. As such, the water is typically a sulfate-rich produced water or sulfate-rich sea water, wherein a subterranean formation or the sea, respectively, is an abundant source of the water.

The low sulfate liquid outlet 60 is connected to a low sulfate liquid line 68, which extends to the liquid inlet 30, providing selective fluid communication between the mixer 20 and the sulfate removal unit 22. A liquid by-pass line 70 is further provided, connecting the aqueous liquid line 62 and the liquid inlet 30 to enable selective direct fluid communication between the source of the aqueous liquid feed stream and the mixer 20, by-passing the sulfate removal unit 22. The high sulfate liquid outlet 58 is connected to a high sulfate liquid line 72, which extends to a liquid product discharge line 74, providing selective fluid communication between the sulfate removal unit 22 and a liquid disposal site (not shown). The aqueous liquid line 72 is provided with a pressure controller 75 and a control valve 76 to maintain sufficient back-pressure for effective operation of the sulfate removal unit 22. A liquid recycle line 77 is provided, connecting the aqueous liquid line 62 and the liquid product discharge line 74 in selective fluid communication with one another, enabling recycle of a portion of a mixture of an aqueous liquid product stream from the reaction vessel 24 and a high sulfate brine from the high sulfate chamber 52 to the aqueous liquid line 62. A series of shut-off valves 78a, 78b, 78c, 78d, and 78e are provided in the lines 62, 68, 70, 72, and 77, respectively, which enable selective operation of the system 10 in a sulfate removal mode, a by-pass mode, or a liquid product recycle mode as will be described below.

The reaction vessel 24 is an enclosed fluid-tight container which houses a catalyst bed 80 in an upper portion 82 of the reaction vessel 24. The catalyst bed 80 is preferably a fluid permeable trickle bed formed from a catalyst capable of inducing catalytic oxidation of hydrogen sulfide by oxygen gas to produce sulfate ions. A preferred catalyst is an activated carbon catalyst in solid particle form available from Calgon Corporation, P. O. Box 0717, Pittsburgh, Pa. 15230-1717, U.S.A., under the trade name CENTAUR granular activated carbon. The above-recited catalyst is free of any catalytically active metals and is readily regenerated by calcining to restore its activity after extended use reducing its activity.

The reaction vessel 24 has a reaction mixture inlet 84 in its upper portion 82 above the catalyst bed 80. The reaction vessel 24 also has a liquid product outlet 86 in a lower portion 88 of the reaction vessel 24 beneath the catalyst bed 80 and a gas product outlet 90 in the lower portion 88 of the reaction vessel 24 beneath the catalyst bed 80, but above the liquid product outlet 86. The reaction mixture inlet 84 is connected to the reaction mixture outlet 32 by means of a reaction mixture line 92 providing fluid communication between the mixer 20 and the reaction vessel 24. The liquid product outlet 86 is connected to the liquid disposal site by means of the liquid product discharge line 74 providing fluid communication between the reaction vessel 24 and the liquid disposal site. The liquid disposal site is substantially any environmentally acceptable site, such as the sea or a subterranean formation, depending on availability. The liquid product discharge line 74 is provided with a flow control valve 94 and associated level controller 96, enabling the practitioner to regulate the level of the aqueous liquid product in the reaction vessel 24.

The gas product outlet 90 is connected to a conventional off-gas stack 98 by means of a gas product line 100 providing fluid communication between the reaction vessel 24 and the stack 98. The stack 98 has an upper portion 102 provided with a flare or a vent, enabling discharge of a gas product stream from the reaction vessel 24 to the atmosphere.

It is noted that the reaction vessel 24 is shown herein as enabling the dual functions of a reactor and a product separator within a single integrated unit. It is understood by the skilled artisan, however, that these functions can be enabled in discretely separate reaction and product separation units within the scope of the present invention.

Operation of the system 10 in accordance with the process of the present invention is described hereafter with continued reference to the FIGURE. The process is initiated by metering the first gas feed stream having a hydrogen sulfide gas component into the mixer 20 by means of the meter 36 via the first gas line 34 and the first gas inlet 26. As noted above, the preferred first gas feed stream is a hydrogen sulfide-rich off-gas discharged from the sour gas outlet 18 of the amine unit 12. In any case, the concentration of the hydrogen sulfide component in the first gas feed stream is preferably at least about 1 mole % and more preferably between about 50 and about 100 mole % with the remainder of the first gas feed stream comprising one or more of the following components: carbon dioxide, water vapor and light hydrocarbon gases such as methane. In the preferred embodiment where the first gas feed stream is the hydrogen sulfide-rich off-gas from the amine unit 12, the first gas feed stream is typically metered into the mixer 20 at a rate between about 100 and about 120 m$^3$/hr, a pressure between about 100 and about 150 kPa and a temperature between about 30 and about 40° C., although it is understood by the skilled artisan that the present invention is not limited to the above-recited first gas feed conditions.

The second gas feed stream having an oxygen gas component is simultaneously metered into the mixer 20 by means of the meter 40 via the second gas line 38 and the second gas inlet 28. As noted above, the preferred second gas feed stream is ambient air, which is drawn from the atmosphere by means of the blower 42 and damper 44. In any case, the second gas feed stream is fed to the mixer 20 at a rate such that the mixer 20 contains a substantial excess of the oxygen gas component relative to the hydrogen sulfide gas component, thereby advantageously avoiding the formation of elemental sulfur at any point in the present process. Specifically, the molar ratio of the oxygen gas component to the hydrogen sulfide gas component in the mixer 20 is preferably at least about 12:1. The use of air as the second gas feed stream also advantageously results in a molar ratio of hydrogen sulfide to air in the mixer 20 of at least about 60:1, which provides a dilution level in the mixer 20 well below the normal lower explosion limit of a hydrogen sulfide/air mixture, thereby providing an intrinsic safety factor to the present process. In the preferred embodiment where the second gas feed stream is air obtained from the atmosphere, the second gas feed stream is typically metered into the mixer 20 at a rate between about 6000 and about 7200 m$^3$/hr, a pressure between about 100 and about 150 kPa and a temperature between about 30 and about 40° C., although it is understood by the skilled artisan that the present invention is not limited to the above-recited second gas feed conditions.

Delivery of the aqueous liquid feed stream to the mixer 20 is effected in accordance with one of three operational modes: 1) the sulfate removal mode; 2) the by-pass mode; or 3) the recycle mode. The process must be practiced at all times in the sulfate removal mode of operation, in the by-pass mode of operation, or in both of these modes of operation simultaneously. The process is typically practiced in the sulfate removal mode of operation to the exclusion of the by-pass mode of operation or vice versa, although the process may be practiced in both modes of operation simultaneously by apportioning a part of the aqueous liquid feed stream to the sulfate removal mode and apportioning the remainder to the by-pass mode. The recycle mode is an optional mode of operation, which may be practiced simultaneously with any of the above-recited combinations of operational modes to reduce the quantity of the aqueous liquid feed stream required and to produce a more concentrated liquid product.

The process is initially described operating exclusively in the sulfate removal mode, wherein the shutoff valves 78a, 78b, and 78d are open and the shutoff valves 78c and 78e are closed. The sulfate removal mode of operation is generally employed when the aqueous liquid feed stream is initially a high sulfate liquid having a preexisting sulfate ion concentration of at least about 0.05 mole % and preferably between about 0.05 and about 0.1 mole %. The above-recited preexisting sulfate ion concentrations refer solely to the concentration of free dissociated sulfate ions in the aqueous liquid feed stream. As noted above, the preferred high sulfate liquid is a water of the type available in remote oil field locales, such as a sulfate-rich produced water or sulfate-rich sea water.

The aqueous liquid feed stream in the form of a high sulfate liquid is pumped to the high sulfate chamber 52 of the sulfate removal unit 22 by means of the pump 66 via the aqueous liquid line 62, shutoff valve 78a, and high sulfate liquid inlet 56. The high sulfate liquid is typically pumped into to the high sulfate chamber 52 at a rate between about 100,000 and about 150,000 kg/hr, a pressure between about 1800 and about 2000 kPa and a temperature between about 20 and about 30° C., although it is understood by the skilled artisan that the present invention is not limited to the above-recited high sulfate liquid feed conditions. The high sulfate liquid is driven against the first side 48 of the selective membrane 46 positioned in the sulfate removal unit 22, producing a low sulfate liquid on the second side 50 of the selective membrane 46 in the low sulfate chamber 54. Thus, the sulfate removal unit 22 functions to convert the aqueous liquid feed stream from a high sulfate liquid to a low sulfate liquid, which is discharged from the low sulfate chamber 54 to the mixer 20 via the low sulfate liquid outlet 60, low sulfate liquid line 68, shutoff valve 78b and liquid inlet 30 at a rate between about 45,000 and about 50,000 kg/hr, a pressure between about 100 and about 150 kPa and a temperature between about 20 and about 30° C., although it is understood by the skilled artisan that the present invention is not limited to the above-recited low sulfate liquid discharge conditions. The resulting low sulfate liquid has a reduced sulfate ion concentration below about 0.005 mole % and preferably between about 0.002 and about 0.001 mole %. The low sulfate liquid may further comprise one or more of the following dissolved ions: $Na^+, K^+, Mg^{2+}, Cl^-, Br^-, HCO_3^-$. The sulfate removal unit 22 also produces a high sulfate brine in the high sulfate chamber 52, which is discharged to the liquid disposal site via the high sulfate liquid outlet 58, high sulfate liquid line 72, shutoff valve 78d, back-pressure control valve 76, and liquid product discharge line 74 at a rate between about 50,000 and about 100,000 kg/hr, a pressure between about 100 and about 150 kPa and a temperature between about 25 and about 35° C., although it is understood by the skilled artisan that the present invention is not limited to the above-recited high sulfate brine discharge conditions.

The mixer 20 effects rapid and complete mixing of the first and second gas feed streams and the aqueous liquid feed streams to produce the reaction mixture. It is preferable to mix the feed streams in sequence within the mixer 20, initially mixing the aqueous liquid feed stream and second gas feed stream and thereafter mixing the first gas feed stream. Rapid sequential mixing fully aerates the aqueous liquid feed stream and avoids the creation of unmixed pockets of hydrogen sulfide for any appreciable time within the mixer 20. It is noted that the sulfate removal mode of operation reduces the required ratio of the aqueous liquid feed stream to the hydrogen sulfide gas component in the mixer 20. In the absence of preexisting sulfate ions, the preferred molar ratio of the aqueous liquid feed stream to the hydrogen sulfide gas component in the mixer 20 is at least about 25:1. The preferred ratio increases as a function of increasing concentration of preexisting sulfate ions in the low sulfate liquid. Thus, if the concentration of preexisting sulfate ions in the low sulfate liquid is at the above-recited maximum concentration level, the preferred molar ratio of the aqueous liquid feed stream to the hydrogen sulfide gas component in the mixer 20 is at least about 100:1.

The reaction mixture is discharged from the mixer 20 to the reaction vessel 24 via the reaction mixture outlet 32, reaction mixture line 92 and reaction mixture inlet 84 at a rate between about 120,000 and about 143,000 kg/hr. The reaction mixture trickles downward from the upper portion 82 of the reaction vessel 24 through the catalyst bed 80 under the force of gravity. The catalyst bed 80 of the reaction vessel 24 is preferably maintained at a pressure between about 100 and about 150 kPa and a temperature between about 25 and about 35° C., although it is understood by the skilled artisan that the present invention is not limited to the above-recited reaction mixture feed conditions or catalyst operating conditions. The catalyst induces a catalytic oxidation reaction between the hydrogen sulfide gas component and the oxygen gas component of the reaction mixture to form a product mixture containing newly formed sulfate ions while substantially free of elemental sulfur.

The product mixture is a two-phase mixture which is discharged from the bottom of the catalyst bed 80 into the lower portion 88 of the reaction vessel 24. The gas phase of the product mixture, termed the gas product stream, is substantially free of hydrogen sulfide. The gas product stream is withdrawn from the reaction vessel 24 at the gas product outlet 90 immediately beneath the catalyst bed 80. The gas product stream has a hydrogen sulfide concentration less than about 0.1 mole % and preferably less than about 10 ppm, with the remainder of the gas product stream having the following composition: 80% $N_2$, 18% $O_2$, 2% $H_2O$, and trace $CO_2$. The gas product stream is typically withdrawn from the reaction vessel 24 at a rate between about 5900 and about 7100 $m^3$/hr, a pressure between about 100 and about 150 kPa and a temperature between about 25 and about 35° C., although it is understood by the skilled artisan that the present invention is not limited to the above-recited gas product withdrawal conditions. The gas product stream withdrawn from the reaction vessel 24 is conveyed from the gas product outlet 90 to the stack 98 via the gas product line 100. The gas product stream is disposed to the atmosphere by means of the flare or vent provided at the upper portion 102 of the stack 98.

The liquid phase of the product mixture, termed the aqueous liquid product stream, retains the produced sulfate ions in solution. The aqueous liquid product stream is withdrawn from the reaction vessel 24 at the liquid product outlet 86 which is positioned beneath the gas product outlet 90. The liquid product stream has a sulfate ion concentration of at least about 1 mole % and preferably between about 2 and about 3 mole %, with the remainder of the liquid product stream being substantially water. The liquid product stream may also contain $Na^+$, $K^+$, $Mg^{2+}$, $Cl^-$, $Br^-$, $HCO_3^-$ in concentrations similar to that of the aqueous liquid feed stream. The liquid product stream is typically withdrawn from the reaction vessel 24 at a rate between about 50,000 and about 62,000 kg/hr, a pressure between about 100 and about 150 kPa and a temperature between about 25 and about 35° C., although it is understood by the skilled artisan that the present invention is not limited to the above-recited liquid product withdrawal conditions. Withdrawal of the liquid product stream from the reaction vessel 24 via the liquid product outlet 86 is automatically regulated by the flow control valve 94 and associated level controller 96. The liquid product stream is conveyed from the liquid product outlet 86 to the liquid disposal site via the liquid product discharge line 74.

Practice of the recycle mode while in the sulfate removal mode of operation is effected by opening the shutoff valve 78e in the liquid recycle line 77. A portion of the liquid product stream is recycled from the liquid product discharge line 74 to the mixer 20 via the recycle line 77, while the remainder of the liquid product stream is conveyed to the liquid disposal site.

Operation of the present process exclusively in the by-pass mode is practiced by closing the shutoff valves 78a, 78b, 78d, and 78e and opening the shutoff valve 78c. The by-pass mode of operation is generally employed when the aqueous liquid feed stream is initially a low sulfate liquid having a relatively low preexisting sulfate ion concentration below about 1 mole % and preferably below about 0.1 mole %. In accordance with the by-pass mode, the aqueous liquid feed stream is fed directly from the source to the mixer 20 via the pump 66, aqueous liquid line 62, aqueous liquid by-pass line 70, shutoff valve 78c, and liquid inlet 30 without passing the aqueous liquid feed stream through the sulfate removal unit 22. Alternatively, the by-pass mode may be practiced when the aqueous liquid feed stream is initially a high sulfate liquid, if the system 10 has the capacity for very large quantities of the aqueous liquid feed stream relative to the first gas feed stream. Practice of the recycle mode while in the by-pass mode of operation is effected in substantially the same manner as described above while in the sulfate removal mode of operation.

While a foregoing preferred embodiment of the invention has been described and shown above, it is understood that alternatives and modifications, such as those suggested and others, may be made thereto and fall within the scope of the present invention. In particular, it is apparent to the skilled artisan from the teaching herein that the system 10 can be alternately adapted within the scope of the present invention to any number of gas feed streams containing a hydrogen sulfide component other than the hydrogen sulfide-containing off-gas of the amine process, which is recited above by way of example.

I claim:

1. A process for disposing hydrogen sulfide present in a gas stream comprising:

a) mixing a first gas feed stream having a hydrogen sulfide gas component, a second gas feed stream having an oxygen gas component, and an aqueous liquid feed stream to form a reaction mixture;

b) contacting said reaction mixture with a catalyst; and c) catalytically reacting said hydrogen sulfide gas component with said oxygen gas component in the presence of said catalyst to produce sulfate ions contained within a product mixture, wherein said product mixture includes an aqueous liquid product stream having said sulfate ions and a gas product stream substantially free of hydrogen sulfide gas.

2. The hydrogen sulfide disposal process of claim 1 wherein said aqueous liquid feed stream includes preexisting sulfate ions, said process further comprising removing said preexisting sulfate ions from said aqueous liquid feed stream.

3. The hydrogen sulfide disposal process of claim 2 wherein said preexisting sulfate ions are removed from said aqueous liquid feed stream before mixing said aqueous liquid feed stream with said first and second gas streams.

4. The hydrogen sulfide disposal process of claim 2 wherein said preexisting sulfate ions are removed from said aqueous liquid feed stream by membrane separation utilizing a selective membrane.

5. The hydrogen sulfide disposal process of claim 4 wherein said selective membrane is a polyamide or polyimide membrane.

6. The hydrogen sulfide disposal process of claim 1 wherein said second gas feed stream is air.

7. The hydrogen sulfide disposal process of claim 1 wherein said aqueous liquid stream is water which is produced from a subterranean formation or sea water.

8. The hydrogen sulfide disposal process of claim 1 further comprising separating said gas product stream from said aqueous liquid product stream.

9. The hydrogen sulfide disposal process of claim 1 further comprising discharging said gas product stream into the atmosphere.

10. The hydrogen sulfide disposal process of claim 1 further comprising discharging said aqueous liquid product stream into the environment.

11. The hydrogen sulfide disposal process of claim 1 wherein said first gas feed stream is an off-gas from a unit for removing hydrogen sulfide from a natural gas.

12. The hydrogen sulfide disposal process of claim 1 wherein said catalyst is an activated carbon capable of catalytic oxidation of said hydrogen sulfide gas component.

13. A process for disposing hydrogen sulfide present in a gas stream comprising:

a) removing preexisting sulfate ions from an aqueous liquid feed stream;

b) mixing a first gas feed stream having a hydrogen sulfide gas component, a second gas feed stream having an oxygen gas component, and said aqueous liquid feed stream to form a reaction mixture;

c) contacting said reaction mixture with a catalyst; and d) catalytically reacting said hydrogen sulfide gas component with said oxygen gas component in the presence of said catalyst to produce sulfate ions contained within a product mixture, wherein said product mixture includes an aqueous liquid product stream having said sulfate ions and a gas product stream substantially free of hydrogen sulfide gas.

14. The hydrogen sulfide disposal process of claim 13 wherein said preexisting sulfate ions are removed from said aqueous liquid feed stream by membrane separation using a selective membrane.

15. The hydrogen sulfide disposal process of claim 14 wherein said selective membrane is a polyamide or polyimide membrane.

16. The hydrogen sulfide disposal process of claim 13 wherein said second gas feed stream is air.

17. The hydrogen sulfide disposal process of claim 13 wherein said aqueous liquid stream is water which is produced from a subterranean formation or sea water.

18. The hydrogen sulfide disposal process of claim 13 further comprising separating said gas product stream from said aqueous liquid product stream.

19. The hydrogen sulfide disposal process of claim 13 further comprising discharging said gas product stream into the atmosphere.

20. The hydrogen sulfide disposal process of claim 13 further comprising discharging said aqueous liquid product stream into the environment.

21. The hydrogen sulfide disposal process of claim 13 wherein said first gas feed stream is an off-gas from a unit for removing hydrogen sulfide from a natural gas.

22. The hydrogen sulfide disposal process of claim 13 wherein said catalyst is an activated carbon capable of catalytic oxidation of said hydrogen sulfide gas component.

* * * * *